United States Patent
Tu et al.

(10) Patent No.: US 7,602,130 B2
(45) Date of Patent: Oct. 13, 2009

(54) APPARATUS FOR SELF-GENERATING A DRIVING FORCE TO ROTATE A SHAFT WITHOUT EXTERNAL POWER AFTER INITIAL ACTIVATION

(75) Inventors: Yu-Ta Tu, Hsinchu Hsien (TW); Show-Jong Yeh, Hemet, CA (US)

(73) Assignee: Sunyen Co., Ltd., Taipei (TW)

( * ) Notice: Subject to any disclaimer, the term of this patent is extended or adjusted under 35 U.S.C. 154(b) by 974 days.

(21) Appl. No.: 10/152,718

(22) Filed: May 23, 2002

(65) Prior Publication Data
US 2003/0210003 A1    Nov. 13, 2003

(30) Foreign Application Priority Data
May 13, 2002    (TW)  ............... 91109869 A

(51) Int. Cl.
| | |
|---|---|
| H02K 31/00 | (2006.01) |
| H02K 23/00 | (2006.01) |
| H02P 1/18 | (2006.01) |
| H02P 3/08 | (2006.01) |
| H02P 7/06 | (2006.01) |
| H02K 21/00 | (2006.01) |

(52) U.S. Cl. ............... 318/254.1; 318/150; 318/498; 310/156

(58) Field of Classification Search ............ 310/152, 310/40 R, 179, 180, 113, 154, 156, 181; 74/9; 318/498, 254, 138, 439
See application file for complete search history.

(56) References Cited

U.S. PATENT DOCUMENTS

| | | | |
|---|---|---|---|
| 3,040,225 A | 6/1962 | Reich | |
| 3,118,098 A | 1/1964 | Reich | |
| 3,474,314 A | 10/1969 | Ito | |
| 4,055,789 A | 10/1977 | Lasater | |
| 5,191,255 A * | 3/1993 | Kloosterhouse et al. | 310/156.38 |
| 5,192,899 A | 3/1993 | Simpson et al. | |
| 5,258,697 A * | 11/1993 | Ford et al. | 318/498 |
| 5,304,881 A | 4/1994 | Flynn et al. | |
| 5,574,340 A | 11/1996 | Bisel et al. | |
| 5,719,453 A * | 2/1998 | Horst | 310/68 R |
| 5,753,990 A | 5/1998 | Flynn et al. | |
| 5,786,645 A * | 7/1998 | Obidniak | 310/68 R |
| 6,255,753 B1 * | 7/2001 | MacDonald | 310/179 |
| 6,362,718 B1 * | 3/2002 | Patrick et al. | 336/214 |
| 6,392,370 B1 | 5/2002 | Bedini | |
| 6,849,984 B2 * | 2/2005 | Gallant | 310/178 |
| 2003/0030344 A1 * | 2/2003 | Hatz et al. | 310/179 |

OTHER PUBLICATIONS http://www.icehouse.net/john1/idea.html, "Ideas and Motors", p. 1, Aug. 21, 2002.
http://www.icehouse.net/john1/idea.html, "Adams Type Test Motor". p. 2, Aug, 21, 2002.

* cited by examiner

*Primary Examiner*—Jeffrey Donels
(74) *Attorney, Agent, or Firm*—Bacon & Thomas, PLLC

(57) ABSTRACT

An apparatus for self-generating a driving force employs an electromotive force generated on a coil by electromagnetic induction, in combination with a mechanical driving device to drive a rotating shaft of the device, such that the rotating shaft can rotate without any external power after an initial activation. The apparatus comprises a mechanical driving device, at least two coils, wherein the mechanical driving device includes arms in attachment with magnetic bodies, thereby enabling an opposite electromotive force to be generated based on an electromagnetic induction to apply a force on the magnetic bodies for a rotation of the shaft.

6 Claims, 2 Drawing Sheets

APPARATUS FOR SELF-GENERATING A DRIVING FORCE TO ROTATE A SHAFT WITHOUT EXTERNAL POWER AFTER INITIAL ACTIVATION

BACKGROUND OF THE INVENTION

1. Field of the Invention

The invention relates to an apparatus for self-generating a driving force, and more particularly to an apparatus for using an electromotive force, which is generated on a coil by an electromagnetic induction, in combination with a mechanical driving device to drive a rotating shaft of the device.

2. Description of the Related Art

Typically, a driving force generating apparatus employs energy, such as fuel, thermal power, hydraulic power, wind force, solar energy, or nuclear energy to generate a driving force in order to drive a rotating shaft of a mechanical driving device.

However, in the circumstances that these energies have become increasingly exhausted and pollution of most of these energies have been inevitably increased, it is necessary to develop an apparatus capable of self-generating a driving force with a low cost and extreme simplicity as well to get rid of the problems, such as the pollution of nuclear or any inconvenience affected by the weather on solar energy, etc.

Conventionally, in accordance with Faraday's Electromagnetic Induction Law, when magnetic induction comes into effect on a conductor, an electromotive force can be induced. The induced electromotive force is generally proportional to a relative moving speed between a magnetic source and a conductor. Further, it is known that according to the Lenz's Law, while a relative moving speed between a magnetic source and a conductor changes such that magnetic flux varies to generate an electromotive force, a new magnetic field can be generated and a new force can also be generated against that electromotive force generated by a preceding magnetic field.

FIG. 1 is a schematic drawing, showing an electromagnetic induction theory according to the Faraday's Law and the Len's Law. As shown in FIG. 1, when a magnetic body 1 moves in relation to a coil 2 at a speed v and effects on the coil 2, an induced electromotive force and thus an induced current I can be generated by the coil 2 in accordance with the Faraday's Law, since the coil 2 transverses across a magnetic line of force such that a magnetic field induced on the coil 2 varies, in that the induced current I is proportional to a magnetic field strength and the relative moving speed v. Also, according to the Lenz's Law, the induced electromotive force is possible to allow the coil 2 to generate an opposite force F against a variation of the magnetic field of the magnetic body 1, in that the opposite force F (i.e., the opposite electromotive force) is obtained by multiplying a magnetic flux density B of the magnetic body 1 with the induced current I and total length L of the coil 2, i.e., $$F = k \cdot B \cdot I \cdot L \ (k \text{ is a constant}),$$

thereby, the opposite force F can then sequentially induce another force F'.

Therefore, provided that the opposite force F (and/or the force F') can be effectively employed in combination with a mechanical driving device to drive a rotating shaft thereof, and force F or F' is much greater than the net friction force, the rotating shaft can be rotated continuously for a finite period without external power after an initial input of external power caused by initially activating the rotating shaft by a short period of external force so that kinetic energy can be produced.

SUMMARY OF THE INVENTION

Therefore, an object of the invention is to provide an apparatus for self-generating a driving force, which can use an electromotive force generated on a coil by an electromagnetic induction together with a mechanical driving device to drive a rotating shaft of that device so as to generate an energy without any pollution and any inconvenience affected by the weather.

In order to achieve the above object, according to an aspect of the invention, there is provided with an apparatus for self-generating a driving force, comprising:

a mechanical driving device, having a rotating shaft, the rotating shaft including at least one set of two arms, the two arms arranged at a predetermined angle with respect to each other, an end of each of the arms attached with at least one magnetic body; and at least one set of two coils, arranged stationary at the predetermined angle, one opening of each coil perpendicularly facing the rotating shaft, wherein winding terminals at the one opening of each set of coils are electrically connected with each other through a switching element arranged to turn on when a current is induced in one of coils to thereby short a circuit through the other of coils and generate an electromotive force and produce a repulsive force between other coil and a corresponding magnetic body, other winding terminals at the other opening of each set of coils are electrically connected together directly, wherein a polarity of each magnetic body is arranged such that a repulsive force is present between each of the magnetic body and a corresponding coil.

Further, according to the above aspect, the magnetic body includes a permanent magnet.

Further, according to the above aspect, the coil includes a permeable material, an air core, and\or the like.

Further, according to the above aspect, the arm is welded on the rotating shaft perpendicularly and/or in a predetermined angle.

Other aspects and advantages of the present invention will become apparent from the following detailed description, taken in conjunction with the accompanying drawings, illustrated by way of example of the principles of the invention.

BRIEF DESCRIPTION OF THE DRAWINGS

The invention will present in detail the following description of a preferred exemplary example with reference to the following drawings, wherein.

DETAILED DESCRIPTION OF THE INVENTION

Figure 1:
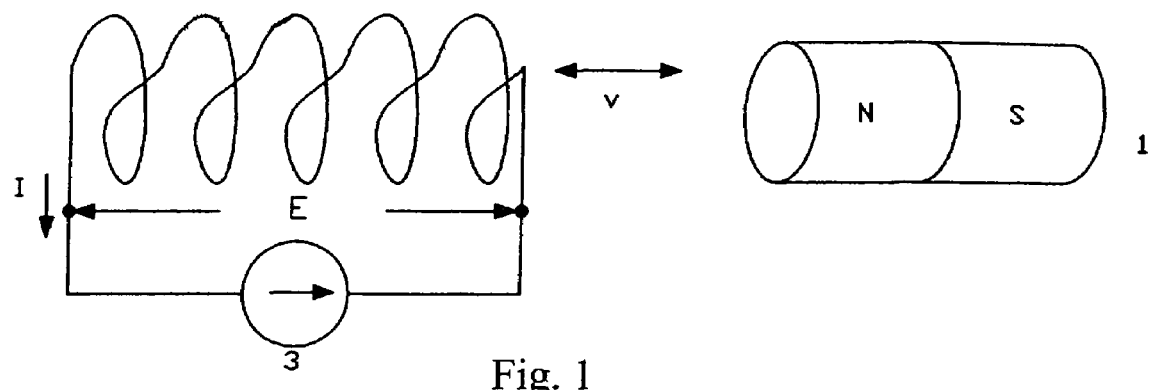
FIG. 1 is a schematic drawing showing an electromagnetic induction theory according to the Faraday's Law and the Lenz's Law.
Figure 2:
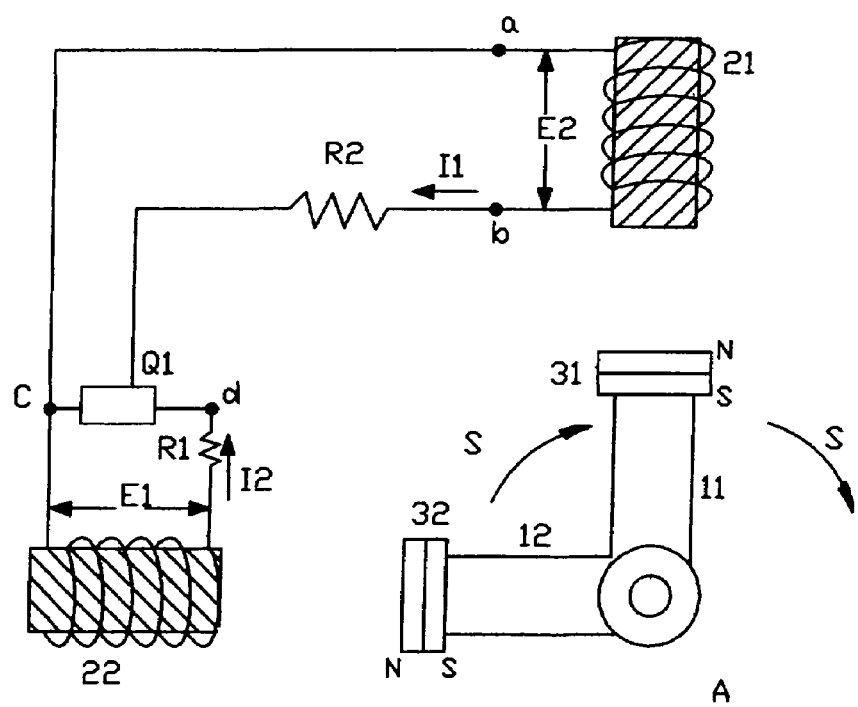
FIG. 2 is a structural schematic drawing, showing an apparatus for self-generating a driving force in accordance with a preferred embodiment of the invention.

With reference to FIG. 2, FIG. 2 is a structural schematic drawing showing an apparatus for self-generating a driving force in accordance with the invention. As shown in FIG. 2, according to the invention, an apparatus for self-generating a driving force comprises a mechanical driving device. The mechanical driving device includes a rotating shaft A, on which at least one set of two arms 11, 12 are included: arms 11 and 12 may be a single member or may be separately connected to the shaft. The quantity of arms 11, 12 are not limited as illustrated in the drawing. Preferably, the quantity of arms 11, 12 can be a plurality of arms, which are symmetrically arranged at a predetermined angle on the shaft A, respectively. The arms 11, 12 can be preferably welded on the rotating shaft A perpendicularly and/or in a predetermined angle. One end of each of the arms has a magnetic body 31, 32 attached. Preferably, the magnetic body 31, 32 includes a permanent magnetic material. Each of the magnetic bodies 31, 32 has a same direction of a polarity, which is arranged in a direction of the corresponding arm 11, 12. The apparatus further includes at least one set of two coils 21, 22, which are arranged to be stationary at the same angle as the predetermined angle for the arms 11, 12. In this embodiment, the quantity of the coils is in correspondence with that of the arms. However, the quantity of the coils is not restrictive as illustrated in the drawing. One opening of each coil 21, 22 faces perpendicularly to the shaft A. As shown in the figure, two winding terminals b, d located respectively at the opening of each coil 21, 22 are connected to each other through a switching element, such as a transistor Q1, and other two winding terminals a, c located at the other opening of each coil 21, 22 are electrically connected directly.

Figure 3:
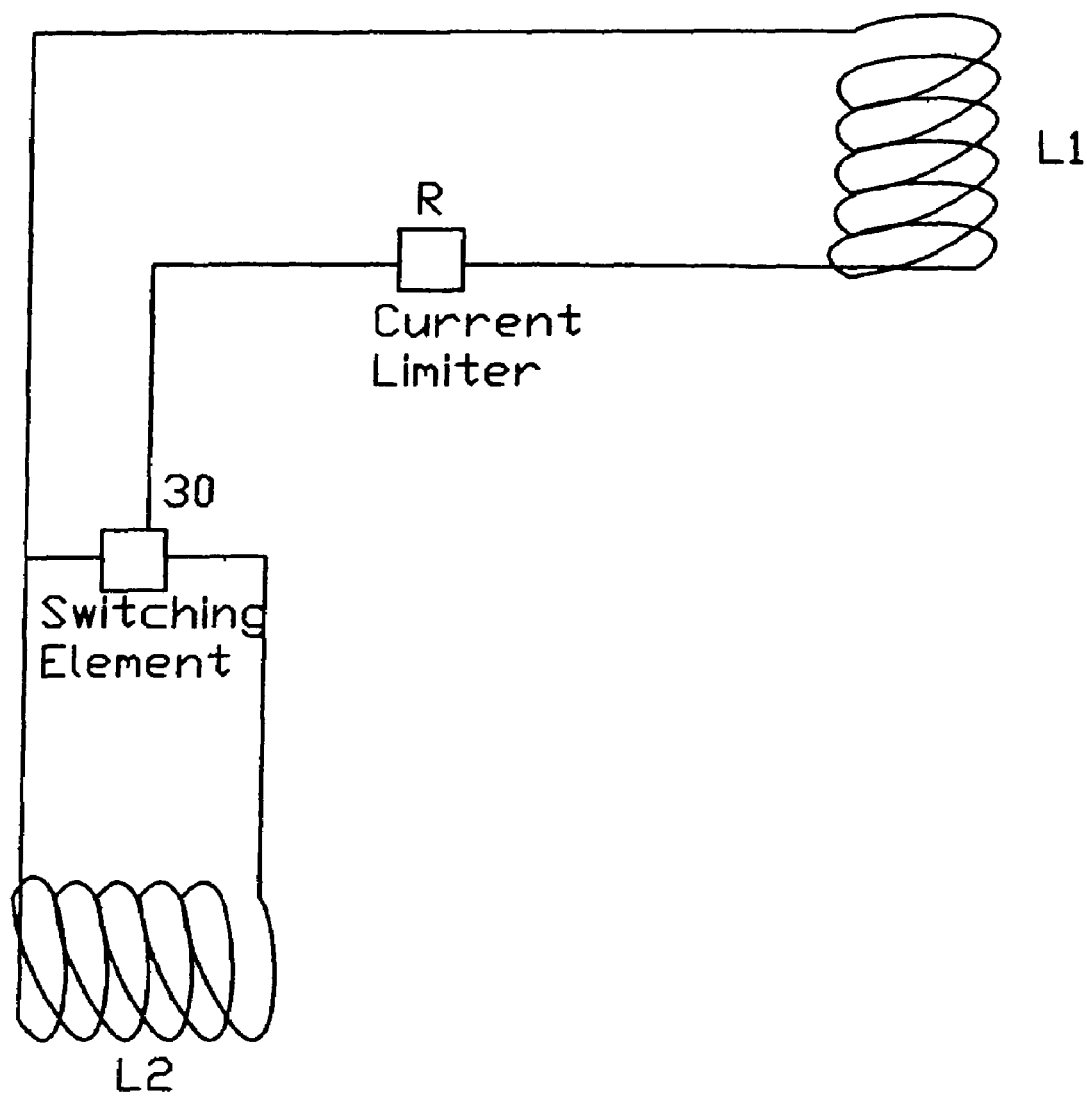
FIG. 3 is a schematic drawing showing a general circuit of an apparatus for self-generating a driving force according to the invention.

FIG. 3 showing a more general circuit. Switching element 30 may be a transistor, a relay, an optical coupling device, a hall effect device, or any other switching element.

The following description will illustrate the operation of the apparatus according to the present invention. As shown in Fig. 2, when the magnetic body 32 passes by an opening of coil 22, the coil 22 can be induced an electromotive force E1. Meanwhile, an electromotive force E2 can also be induced on the coil 21 by the other magnetic body 31 that induces a current I1. The induced current I1 flows through a current limited R2 and turns on the transistor Q1. Since the transistor Q1 turns on, the current I2 flows through the coil 22. Then, the coil 22 may be facilitated to generate an opposite force (i.e., an opposite electromotive force) so as to drive the arms moving forward the direction S. Thus, the rotating shaft A can be driven to rotate. Therefore, the rotating shaft A may rotate in a predetermined direction without any external power for a finite period after initially activating the shaft by means of applying a short period of an external force, such as a manual force.

Coils 21 and 22 may be air core or may have cores made of a magnetically permeable material.

Having described the preferred exemplary example of the invention, however, which are not intended to be the limit of the invention. It is noted that modifications and variations can be made by persons skilled in the art in light of the above teachings. It is therefore to be understood that various changes, equivalences and modifications may be made in the particular example of the invention without departing from the scope and spirit of the invention as outlined by the appended claims.

| LIST OF REFERENCE NUMERALS | |
| --- | --- |
| 1 | Magnet |
| 2 | Coil |
| 3 | Galvanometer |
| 11, 12 | Link |
| 21, 22 | Coil |
| 30, Q1 | Switching Element |
| 31, 32 | Magnetic Body |
| a, b, c, d | Terminal of Coil |
| R, R2 | Current Limiter |
| A | Rotating Shaft |
| S | Rotation Direction |
| I, I1, I2 | Induced Current |
| E1, E2 | Electromotive Force |
| V | Speed |
| F, F' | Force |
| B | Magnetic Flux Density |
| L | Total Length of Coil |
| L1, L2 | Coil |

What is claimed is:

1. An apparatus for self-generating a driving force after initial activation by an external force, comprising:
   a mechanical driving device, having a rotating shaft, the rotating shaft including at least one set of two arms, said two arms arranged at a predetermined angle with each other, an end of each of said arms attached with at least one magnetic body; and
   at least one set of two coils, arranged stationary in said predetermined angle, one opening of each coil perpendicularly facing said rotating shaft,
   wherein winding terminals at said one opening of each said set of said coils are electrically connected with each other through a switching element arranged to turn on when a current is induced in one of said coils to thereby short a circuit through the other of said coils and generate an electromotive force in said other coil to thereby produce a repulsive force between said other coil and a corresponding magnetic body, other winding terminals at the other opening of each said set of said coils are electrically connected together directly, wherein a polarity of each magnetic body is arranged such that a repulsive force is present between each of said magnetic body and a corresponding coil.

2. The apparatus according to claim 1, wherein said magnetic body includes a permanent magnet.

3. The apparatus according to claim 1, wherein said coil contains a permeable material or an air core.

4. The apparatus according to claim 1, wherein said arms are welded on said rotating shaft.

5. The apparatus according to claim 1, wherein said switching element includes transistor, relay, optical coupling device, or Hall effect device.

6. The apparatus according to claim 4, wherein said arms are welded on said rotating shaft perpendicularly.

* * * * *

UNITED STATES PATENT AND TRADEMARK OFFICE
CERTIFICATE OF CORRECTION

PATENT NO.        : 7,602,130 B2
APPLICATION NO. : 10/152718
DATED             : October 13, 2009
INVENTOR(S)      : Tu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1010 days.

Signed and Sealed this

Fifth Day of October, 2010

David J. Kappos
*Director of the United States Patent and Trademark Office*